UNITED STATES PATENT OFFICE.

GEORGE CLEVELAND HICKS, OF BOSTON, MASSACHUSETTS.

STOVE-LINING.

SPECIFICATION forming part of Letters Patent No. 607,928, dated July 26, 1898.

Application filed September 7, 1897. Serial No. 650,730. (No specimens.)

*To all whom it may concern:*

Be it known that I, GEORGE CLEVELAND HICKS, of Boston, in the county of Suffolk and State of Massachusetts, have invented certain new and useful Improvements in Stove-Linings, of which the following is a specification.

This invention has for its object to provide a plastic stove-lining composition adapted to be stored and kept in a plastic condition until required for use and then to be manipulated as desired by the user to convert the composition into a lining fitted to the interior of a stove.

The invention consists in the improved composition, which I will now proceed to describe and claim.

In carrying out my invention I prefer to take pulverized fire-clay, pulverized fire-brick, a hygrometric material, such as glycerin, and water and mix the same in such manner as to form a plastic mass, the preferred proportions being as follows, by weight: fire-clay, fifty per cent.; fire-brick, thirty-four per cent.; glycerin, four per cent.; water, twelve per cent. These ingredients are thoroughly mixed and form a composition which has about the consistency of putty. The composition is then subdivided into lumps, each containing a suitable quantity for a stove-lining, each lump being suitably protected against the action of air—for example, by means of a wrapper of paper treated with paraffin and a pasteboard box inclosing the whole.

The composition is adapted to be kept in storage for an indefinite period without losing its plasticity and is ready for use when opened.

The composition can be conveniently cut with a knife into slices, which can be readily fitted to the interior of the fire-box of a stove.

I do not limit myself to the proportions above set forth and may variously modify the same without departing from the spirit of my invention. Neither do I limit myself to the use of fire-brick, as a useful composition may be produced without this ingredient, although the composition including fire-brick is preferable. Any other suitable hygrometric material may be substituted for glycerin. I have found glucose a suitable hygrometric substitute. Both glycerin and glucose are polyatomic alcohols, glycerin being a triatomic alcohol, and any of the glucoses are pentatomic. Therefore by the term "polyatomic alcoholic material" I mean to include both glycerin and glucose.

I claim—

1. As an improved article of manufacture, a mass of plastic stove-lining composition comprising ground refractory material, a polyatomic alcoholic material, and water, protected by an air-excluding envelop or covering.

2. The improved plastic stove-lining composition, comprising fire-clay, fire-brick, glycerin, and water.

In testimony whereof I have signed my name to this specification, in the presence of two subscribing witnesses, this 2d day of September, A. D. 1897.

GEORGE CLEVELAND HICKS.

Witnesses:
   E. BATCHELDER,
   PETER W. PEZZETTI.